Patented Oct. 26, 1937

2,096,749

UNITED STATES PATENT OFFICE 2,096,749

DERIVATIVES OF ALKYLOLAMINE CONDENSATION PRODUCTS

Wolf Kritchevsky, Chicago, Ill.

No Drawing. Application October 8, 1936,
Serial No. 104,710

20 Claims. (Cl. 260—124)

My invention relates to a new class of hydrotropic fatty substances and method of producing the same.

In my prior application, Serial No. 84,230, filed June 8, 1936, as a continuation-in-part of an earlier application, Serial No. 738,688, filed August 6, 1934, I have disclosed new chemical compounds having very valuable properties as emulsifying agents, as assistants in the textile and related industries, and for various other purposes. In general, said chemical compounds are condensation products of alkylolamines and higher molecular weight monocarboxylic acids wherein the molal ratio of the alkylolamine to the acid is not substantially less than two to one. More particularly, the acids employed in said condensation products include the higher molecular weight aliphatic acids and, of this group, the higher fatty acids, especially those having between 12 and 18 carbon atoms, have been found especially useful.

In my prior application, Serial No. 84,229, filed June 8, 1936, also as a continuation-in-part of my earlier application, Serial No. 738,688, I have disclosed new chemical compounds having valuable technical properties which chemical compounds, in general, comprise condensation products of alkylolamines, amines and higher carboxylic acids, particularly higher fatty acids, the molal ratio of said reacting constituents being one mol. of acid, at least one mol. of alkylolamine and at least one mol. of amine.

In my prior application, Serial No. 84,228 filed June 8, 1936, also as a continuation-in-part of my earlier application, Serial No. 738,688, I have disclosed new chemical compounds having valuable technical properties, which chemical compounds, in general, comprise condensation products of alkylolamines and polycarboxylic acids wherein there is present not substantially less than two mols of alkylolamine for each carboxyl group of the polycarboxylic acid.

In each of the three applications referred to hereinabove, and, as described therein, instead of the free acids, derivatives thereof may be employed such as esters, amides, anhydrides and halides.

I have now found that if any of the condensation products described above is treated with an alkylating, aralkylating, or arylating agent, new chemical compounds result having valuable technical properties, particularly in connection with pharmaceuticals, in the textile and related industries, where they function, among other purposes, as softening agents, and as emulsifying agents for oleaginous materials.

The following examples are illustrative of my invention but it is to be understood that the invention is not to be limited except as defined in the appended claims.

Example I

About 462 pounds of a condensation product of coconut oil fatty acids and diethanolamine, the molal ratio of the diethanolamine to the acids being two to one, and resulting from heating together approximately equal weights of said reacting constituents at a temperature between 160 degrees C. and 170 degrees C. for from about 3 to 7½ hours (the length of time depending upon the temperature), is mixed, at room temperature, with 140 pounds of dimethyl sulphate. The dimethyl sulphate is added slowly to the condensation product at about room temperature. The reaction is exothermic and the temperature spontaneously rises. The addition of the dimethyl sulphate is regulated so that the temperature rises to between 100 degrees C. and 110 degrees C. After all of the dimethyl sulphate has been added, the mass may be heated, if desired, to maintain it between 100 degrees C. and 110 degrees C. to complete the reaction. It is advisable not to substantially exceed a temperature of about 130 degrees C. in order to obtain the best results. The reaction mass is kept at the desired temperature for about two hours. A soap-like compound is formed which is easily and clearly soluble in water and possesses excellent surface tension reducing properties.

Example II

A condensation product of one mol. of stearic acid and two mols of monoethanolamine is prepared by heating the mixture at about 200 degrees C. for approximately three hours. About 400 parts by weight of the resulting waxy product is treated with 140 parts by weight benzyl chloride and the reaction mixture is kept at about 110 degrees C. to 125 degrees C., exercising the same general precautions as described in connection with Example I. The reaction is permitted to proceed until the benzyl chloride odor disappears. A compound results having soapy characteristics and possessing excellent technical properties.

Example III

One mol. of abietic acid is condensed with three mols of diethanolamine at about 210 degrees C. to 220 degrees C. for approximately three hours. About 600 parts by weight of the resulting product, which is a thick oily substance, is reacted with 200 parts by weight of dimethyl sulphate, the same general precautions being observed as pointed out in connection with Example I. The final product has excellent technical properties.

*Example IV*

One mol. of japan wax and five mols of diethanolamine are condensed at a temperature between 160 degrees C. and 180 degrees C. for three to four hours. About 900 parts by weight of the resulting product are reacted with 200 parts by weight of dimethyl sulphate in a manner similar to that described hereinabove. The resulting product possesses saponaceous properties and has marked utility for various technical purposes.

*Example V*

One mol. of oleic acid and two mols of diethanolamine are condensed at a temperature of between 160 degrees C. and 180 degrees C. for three to four hours. About 500 parts by weight of this reaction product, at room temperature, is reacted with about 150 parts by weight of methyl iodide. The reaction takes place with the evolution of heat and an oleaginous product results having excellent emulsifying properties.

*Example VI*

One mol. of coconut oil fatty acids is mixed with one mol. of monoethanolamine and one mol. of butylamine and the mixture is heated for from two to four hours at a temperature between 150 degrees C. and 175 degrees C. About 390 parts by weight of the resulting condensation product is reacted with 140 parts by weight of dimethyl sulphate, the same general precautions being exercised as in connection with Example I.

*Example VII*

500 parts by weight of a condensation product of one mol. of stearic acid and two mols of diethanolamine, produced by heating said materials at a temperature of about 200 degrees C. for three to four hours, is mixed, at room temperature, with 130 parts by weight of benzyl chloride. The mass is then heated for several hours at about 110 degrees C. to 125 degrees C. until the odor of the benzyl chloride disappears. The resulting product, which is oleaginous in character, possesses good technical properties.

*Example VIII*

400 parts by weight of a condensation product of coconut oil fatty acids and diethanolamine, made as described in Example I hereinabove, is reacted with 500 parts by weight of dimethyl sulphate for a few hours, the same general precautions being exercised as in connection with Example I. An oleaginous product having good wetting properties results.

*Example IX*

A condensation product is prepared by heating one mol. of palmitic acid with two mols of diethanolamine at about 175 degrees C. for from two to four hours. After cooling down to room temperature, about 460 parts by weight of said condensation product is reacted with 220 parts by weight of phenyl iodide in accordance with the general procedure set forth above. An oleaginous product having excellent technical properties results.

I have not definitely ascertained the exact structure of the compounds which I produce herein and I, therefore, prefer to claim them as reaction products. The alkylating, aralkylating or arylating agent apparently serves as a means to replace hydrogen of hydroxy groups of the condensation product with alkyl, aralkyl, or aryl radicals. It is also possible that reaction may occur at the nitrogen atom or atoms present in the condensation products. Accordingly, by varying the amount of alkylating, aralkylating or arylating agent which is reacted with the condensation products, I can produce different compounds with varying numbers of alkyl, aralkyl or aryl groups. It will also be readily understood that, in most cases, my compounds represent mixtures of different products, this being particularly the case where, for example, commercial sources of raw materials are employed such as commercial triethanolamine, commercial fatty acids, etc. It is for this additional reason that I prefer to claim my compounds as reaction products rather than by resort to chemical structural formulae.

While I have mentioned dimethyl sulphate, benzyl chloride and phenyl iodide hereinabove as alkylating agents, aralkylating agents, and arylating agents, respectively, other agents such as ethylene chlorhydrin, methyl iodide, methyl chloride, and para-toluene ethyl sulphonate may also be employed. I have, however, in general obtained superior results with dimethyl sulphate.

I employ the term "condensation product" herein, as well as in my copending applications referred to above, to mean a reaction product between the reacting constituents, for example, alkylolamine and acid, wherein water or acid or the like is split out as a result of the union of the molecules of said reacting constituents. Similarly, the word "condensed" means a reaction involving the splitting out of water or acid or the like from the reacting constituents.

I also employ the term "fatty acid", as in my copending applications, to include those acids which are commonly understood to come within the definition of the quoted term but to exclude those acids of the acrylic series wherein there is a double bond in the $\alpha$-$\beta$ position to the carboxylic group.

Wherever the term "higher" is employed herein, it will be understood to cover at least six, unless otherwise stated.

What I claim as new and desire to protect by Letters Patent of the United States is:

1. The reaction product of a member of the group consisting of alkylating, arylating and aralkylating agents and a condensation product of alkylolamine and carboxylic acid, the molal ratio of the alkylolamine to the carboxylic acid present in said condensation product being such that there is not substantially less than two mols of alkylolamine for each carboxyl group present in said acid, said carboxylic acid containing at least twelve carbon atoms.

2. The product of claim 1 wherein the carboxylic acid comprises a mono-carboxylic acid.

3. The product of claim 1 wherein the carboxylic acid comprises an aliphatic carboxylic acid.

4. The product of claim 1 wherein the carboxylic acid comprises an aliphatic mono-carboxylic acid.

5. The product of claim 1 wherein the carboxylic acid comprises fatty acid.

6. The product of claim 1 wherein the alkylolamine comprises an ethanolamine.

7. The reaction product of a member of the group consisting of alkylating, arylating and aralkylating agents and a condensation product of alkylolamine and higher fatty acid, the molal ratio of the alkylolamine to the higher fatty acid present in said condensation product being not substantially less than two to one.

8. The product of claim 7 wherein the alkylating agent is dimethyl sulphate.

9. The product of claim 7 wherein the alkylolamine comprises an ethanolamine.

10. The reaction product of dimethyl sulphate and a condensation product of alkylolamine and fatty acid, said fatty acid containing between 12 and 18 carbon atoms, the molal ratio of the alkylolamine to the fatty acid present in said condensation product being not substantially less than two to one.

11. The product of claim 10 wherein the alkylolamine comprises an ethanolamine.

12. The reaction product of a member of the group consisting of alkylating, arylating and aralkylating agents and a condensation product of alkylolamine and a member of the group consisting of carboxylic acids containing at least twelve carbon atoms, their esters, amides, anhydrides and halides, there being present in said condensation product not substantially less than two mols of alkylolamine for each carboxyl group present in said carboxylic acid.

13. The product of claim 12 wherein the acid is a higher fatty acid.

14. The product of claim 12 wherein the acid is a higher fatty acid and the alkylating agent is dimethyl sulphate.

15. The reaction product of a member of the group consisting of alkylating, arylating and aralkylating agents and a condensation product of at least one mol. of alkylolamine, at least one mol. of amine, and a member of the group consisting of carboxylic acids containing at least twelve carbon atoms, their esters, halides, amides, and anhydrides, approximately one mol. of carboxylic acid being present in said condensation product.

16. The reaction product of a member of the group consisting of alkylating, arylating and aralkylating agents and a condensation product of at least one mol. of alkylolamine, at least one mol. of amine, and a member of the group consisting of higher fatty acids, their esters, halides, amides, and anhydrides, approximately one mol. of higher fatty acid being present in said condensation product.

17. The reaction product of a member of the group consisting of alkylating, aralkylating and arylating agents and a condensation product of alkylolamine and a member of the group consisting of higher fatty acids, their esters, amides, anhydrides and halides, there being present in said condensation product not substantially less than two mols of alkylolamine for each mol. of higher fatty acid present in said condensation product.

18. The product of claim 17 wherein the alkylating agent is dimethyl sulphate.

19. The reaction product of a member of the group consisting of alkylating, aralkylating and arylating agents and a condensation product of alkylolamine and coconut oil fatty acids, their esters, amides, anhydrides and halides, there being present in said condensation product not substantially less than two mols of alkylolamine for each mol. of coconut oil fatty acids present in said condensation product.

20. The reaction product of dimethyl sulphate and a condensation product of coconut oil fatty acids and alkylolamine consisting predominantly of diethanolamine, the molal ratio of the alkylolamine to the coconut oil fatty acids being approximately two to one.

WOLF KRITCHEVSKY.